United States Patent [19]

Tecco et al.

[11] 4,106,672

[45] Aug. 15, 1978

[54] RESEALABLE END CLOSURE HAVING PLURAL OPENINGS

[75] Inventors: Charles Tecco, Northfield; Lawrence E. Lasich, Twinsburg, both of Ohio

[73] Assignee: Weatherchem Corporation, Twinsburg, Ohio

[21] Appl. No.: 803,721

[22] Filed: Jun. 6, 1977

Related U.S. Application Data

[63] Continuation-in-part of Ser. No. 673,073, May 26, 1976, Pat. No. 4,029,202.

[51] Int. Cl.² ............... B65D 39/04; B65D 41/18; B65D 43/16
[52] U.S. Cl. ................... 222/151; 220/339; 222/543; 222/546; 222/565
[58] Field of Search ......... 220/334, 339, 375; 222/151, 543, 546, 556, 565, 567

[56] References Cited

U.S. PATENT DOCUMENTS

| 2,625,306 | 1/1953 | Murphy | 222/543 X |
| 3,675,812 | 7/1972 | Foster | 222/565 X |
| 4,022,352 | 5/1977 | Pehr | 222/556 X |

*Primary Examiner*—Robert B. Reeves
*Assistant Examiner*—David A. Scherbel
*Attorney, Agent, or Firm*—McNenny, Pearne, Gordon, Gail, Dickinson & Schiller

[57] ABSTRACT

A container includes a fiber tube and a plastic end closure. The end closure is of one piece plastic construction and includes a base having a central opening. A dish shaped dispensing wall covers the central opening and provides a plurality of small dispensing holes. A tab covers the central opening of the base and provides a sealing pin for closing each of the dispensing holes.

11 Claims, 3 Drawing Figures

U.S. Patent
Aug. 15, 1978
4,106,672
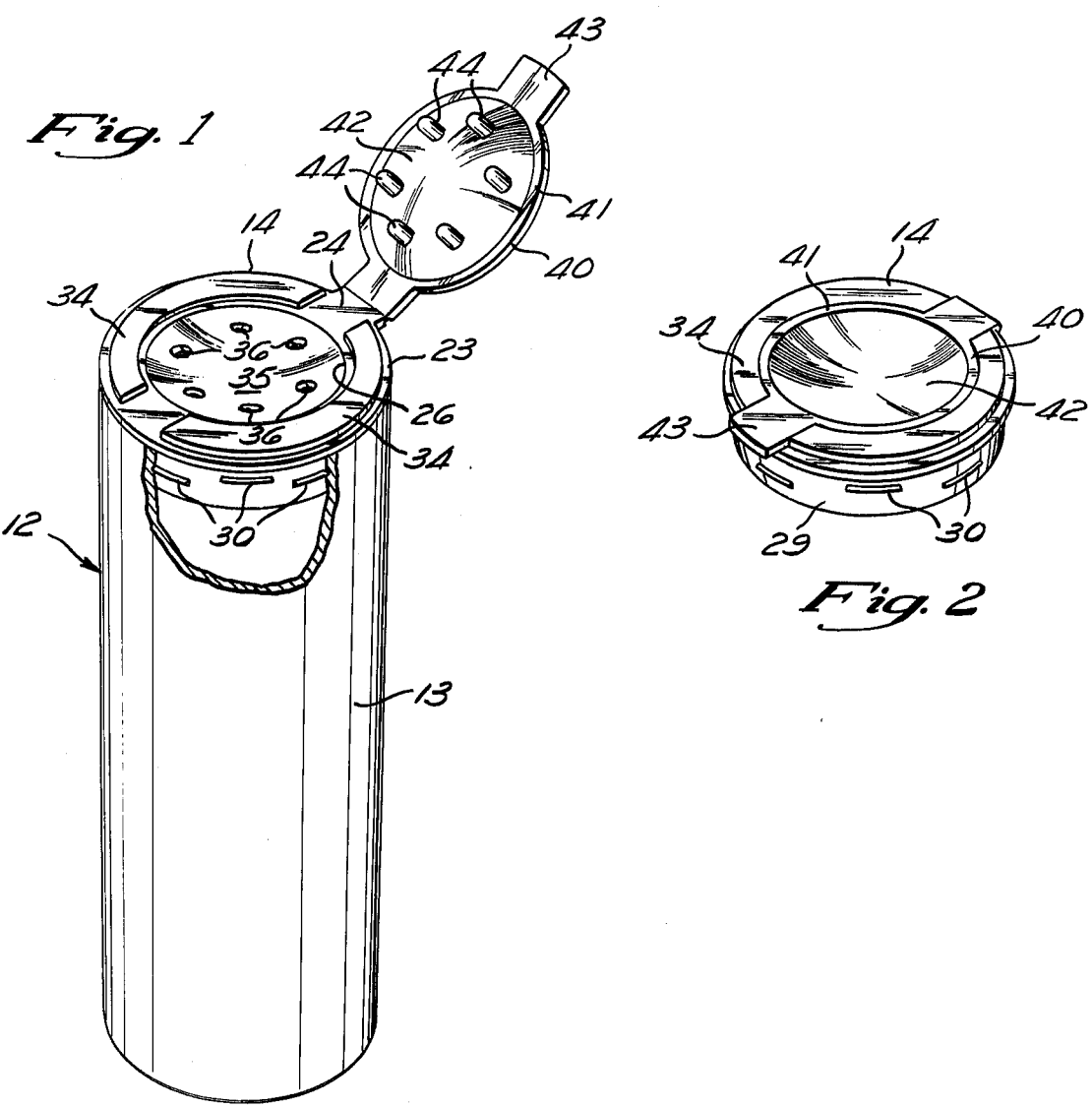
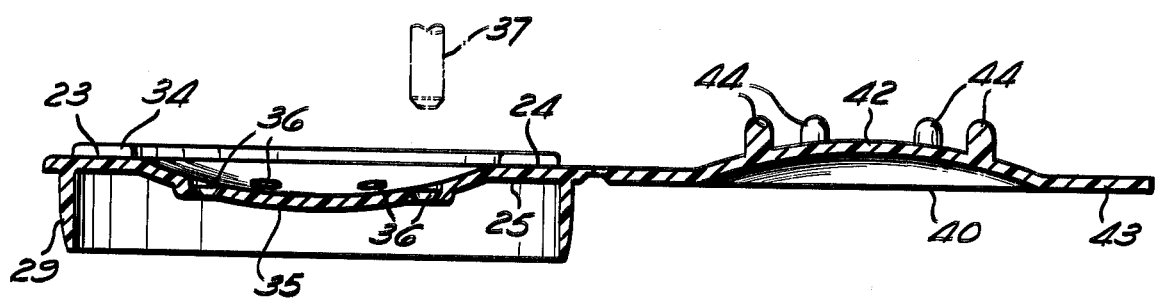

RESEALABLE END CLOSURE HAVING PLURAL OPENINGS

BACKGROUND AND SUMMARY OF THE INVENTION

This application is a continuation-in-part of U.S. patent application Ser. No. 673,073, filed May 26, 1976, now U.S. Pat. No. 4,029,202, the entirety of which is incorporated by reference as though fully set forth herein.

The prior art has provided a wide variety of plastic and closures for containers. Examples of these prior art end closures are shown in U.S. Pat. Nos. 2,625,306; 2,826,343; 3,036,746; and 3,860,135. Each of these patents discloses a one piece plastic end closure which has an annular base and a tab connected to the base for movement between an open position and a closed position.

The present invention departs from these and other prior art end closures by providing a one piece injection molded plastic end closure which includes a flat annular ring-like base. The base has a central opening, and a spherical or dish shaped dispensing wall with several dispensing holes in it covers the central opening. A skirt portion extends from the base and is received in the fiber tube.

The end closure also includes an annular rib disposed on the top of the base. The annular rib is discontinuous and interrupted at two radially opposite locations.

The plastic end closure further includes a tab which is connected to the base at the first discontinuity in the rib. The tab includes a spherical or dish shaped portion which extends into the central opening of the base and covers the dish shaped dispensing wall. A sealing pin extends from the dish shaped portion of the tab into each of the dispensing holes for sealing the holes against leakage. The tab also includes a lifting portion disposed at the location of the second discontinuity in the rib.

BRIEF DESCRIPTION OF THE DRAWINGS

These and other features and advantages of the invention will become more readily apparent from the description of the preferred embodiment of the invention shown in the drawings, wherein:

FIG. 1 is a perspective view of a plastic end closure and a paper fiber tube, with the tab of the end closure shown in an open position;

FIG. 2 is a perspective view of the end closure shown in FIG. 1, but with the tab in view in the closed position; and FIG. 3 is a cross-sectional side elevational view of the end clsoure shown in FIG. 1.

DETAILED DESCRIPTION OF THE DRAWINGS

Referring now to the drawings in greater detail, FIG. 1 shows a container 12 which includes a paper fiber tube 13 and a plastic end closure 14.

The end closure 14 is a one piece integral injection molded product preferably made of a relatively soft polypropylene but alternatively made of polyethylene or any other suitable common polyolefin which may be readily selected by those skilled in the art. The end closure 14 is molded in the open position shown in FIG. 3.

The end closure 14 includes a generally flat annular ring-like base 23. The base 23 has a longitudinally outwardly facing top wall 24, a longitudinally inwardly facing bottom wall 25, and a central opening 26.

An annular skirt 29 depends longitudinally downwardly from the bottom wall 25 of the base 23. The cylindrical outer surface of the skirt 29 is provided with two rows of circumferentially spaced apart ribs 30. The top row of ribs is offset from the bottom row of ribs so that the ribs of the top row are not aligned longitudinally with the ribs of the bottom row. The free end of the skirt 29 remote from the base 23 has a tapered outer portion to facilitate insertion of the skirt 29 into the open end of the tube 13. The skirt 29 may be pushed into the open end of the tube 13 either manually or by automatic machinery, and the skirt 29 is secured in place by the ribs 30. If desired, a suitable adhesive may be applied to the inside of the tube 13 or to the outer surface of the skirt 29 to adhesively secure the end closure 14 in place.

An annular rib 34 is disposed on the top wall 24 of the base 23. The annular rib 34 extends longitudinally outwardly from the base 23 in a direction opposite the direction in which the skirt portion 29 extends. The rib 34 is discontinuous and interrupted at a first location on the base 23 and at a second location on the base 23 radially opposite the first location. This divides the rib 34 into two C-shaped or semicircular portions.

The base 23 also includes a longitudinally inwardly recessed dispensing wall 35. The dispensing wall 35 is spherical or dish shaped, and six dispensing holes 36 extend longitudinally through the wall 35 for dispensing the contents of the container 12. The shape of each of the dispensing holes 36 is determined by the tip of a cylindrical core pin 37, one of which is shown in dotted outline in FIG. 3. The core pin 37 is a part of a mold (not shown) for making the end closure 14. This shape of each of the dispensing holes 36 provides a tapered hole which is enlarged at the top and which is of a reduced diameter at the bottom for sealing purposes as described more fully below.

The end closure 14 also includes a tab 40 which is movable between an open position shown in FIGS. 1 and 3 and a closed position shown in FIG. 2. The tab 40 is connected to the base 23 at the first discontinuity in the rib 34 by a reduced thickness hinge portion. The tab 40 is a disc-shaped member which includes an annular ring-like portion 41. When the tab 40 is in its closed position, the annular portion 41 is seated on the top wall 24 of the base 23.

The tab 40 also includes a longitudinally inwardly recessed center portion 42. The center portion 42 is spherical or dish shaped and extends into the dispensing opening 26 to seat against the dispensing wall 35 when the tab 40 is in its closed position. Additionally, when the tab 40 is in its closed position, the top wall of the annular portion 41 of the tab 40 is substantially coplaner with the top wall of the rib 34. This provides a substantially smooth uninterrupted radial end surface for the closure 14 extending radially inwardly to the recessed center portion 42 about the entire circumferential extent of the end closure 14. Additionally, and particularly by the arrangement of the recessed center portion 42 of the tab 40 projecting into the dispensing opening 26 of the base 23, the end closure 14 is of very low profile so that it does not extensively add to the overall length of the container 12.

A lifting portion 43 extends from the annular portion 41 radially outwardly at the location of the second discontinuity in the rib 34. The lifting portion 43 provides a convenient surface which may be pushed upwardly to open the tab 40 when the tab 40 is in its closed position.

The tab 40 also includes six pins 44 extending longitudinally from the bottom surface of the center portion 42. The pins 44 are arranged so that they are received in the tapered dispensing holes 36 to seal the holes 36 when the tab 40 is in its closed position.

The diameter of each of the six pins 44 is smaller than the diameter of the enlarged top portion of each hole 36 and is larger than the reduced diameter of the lower portion of each of the holes 36. By this arrangement, the pins 44 are aligned with the holes 36 by the enlarged diameter entrant portion and sealingly engage the lower portion of the holes 36. This arrangement individually seals each of the holes 36 when the tab 40 is closed so that each of the dispensing holes 36 is sealed against leakage. This prevents the contents of the container 12 from escaping from the dispensing holes 36 when the tab is closed.

What is claims is:

1. A one-piece plastic end closure comprising a generally flat annular ring like base, said base having a top wall and a bottom wall and a central opening, a dish-shaped dispensing wall in said central opening, a plurality of dispensing holes in said dispensing wall, an annular skirt portion connected to said bottom wall of said base and extending longitudinally away from said base, said skirt portion being adapted to be received within an open end of a fiber tube, an annular rib connected to said top wall of said base and extending longitudinally away from said base in a direction opposite a direction in which said skirt portion extends, said rib being discontinuous and interrupted at a first location and at a second location radially opposite said first location, a tab movable between an open position and a closed position, said tab being hingedly connected to said base at said first location of said discontinuous rib, said tab being a disc shaped member disposed radially inwardly from said rib when said tab is in said closed position, said tab including a longitudinally recessed dish-shaped center portion extending longitudinally into said opening of said base and covering said dish-shaped dispensing wall when said tab is in said closed position, and said tab including a pin extending from said dish-shaped portion of said tab into each of said dispensing holes in said dispensing wall when said tab is in said closed position.

2. A one-piece plastic end closure as set forth in claim 1, wherein said tab includes an annular portion seated on said base when said tab is in said closed position, said annular portion of said tab includes a top wall, and said top wall of said tab annular portion is substantially coplaner with said top wall of said rib when said tab is in said closed position.

3. A one-piece plastic end closure as set forth in claim 1, wherein said tab includes a lifting portion, said lifting portion extends radially outwardly from said annular portion, and said lifting portion is disposed at said second location when said tab is in said closed position.

4. A one-piece plastic end closure as set forth in claim 1, wherein each of said dispensing holes is tapered, and said pins sealingly engage said dispensing holes when said tab is in said closed position.

5. A one-piece plastic end closure as set forth in claim 1, wherein said tab includes an annular portion seated on said base when said tab is in said closed position.

6. A one-piece plastic end closure as set forth in claim 1, wherein each of said dispensing holes includes a first wall portion extending solely in the longitudinal direction and a second wall portion extending both longitudinally and radially inwardly away from said first wall portion.

7. A one-piece plastic end closure comprising a generally flat annular ring like base, said base having a top wall and a bottom wall and a central opening, a dish-shaped dispensing wall in said central opening, a plurality of dispensing holes in said dispensing wall, an annular skirt portion connected to said bottom wall of said base and extending longitudinally away from said base, said skirt portion being adapted to be received within an open end of a fiber tube, an annular rib connected to said top wall of said base and extending longitudinally away from said base in a direction opposite a direction in which said skirt portion extends, said rib being discontinuous and interrupted at a first location and at a second location radially opposite said first location, a tab movable between an open position and a closed position, said tab being hingedly connected to said base at said first location of said discontinuous rib, said tab being a disc shaped member disposed radially inwardly from said rib when said tab is in said closed position, said tab including a longitudinally recessed dish-shaped center portion extending longitudinally into said opening of said base and covering said dish-shaped dispensing wall when said tab is in said closed position, and said tab including a pin extending from said dish-shaped portion of said tab into each of said dispensing holes in said dispensing wall when said tab is in said closed position.

8. A one-piece plastic end closure as set forth in claim 7, wherein each of said dispensing holes is tapered, and said pins sealingly engage said dispensing holes when said tab is in said closed position.

9. A one-piece plastic end closure as set forth in claim 8, wherein each of said dispensing holes includes a first wall portion extending solely in the longitudinal direction and a second wall portion extending both longitudinally and radially inwardly away from said first wall portion.

10. A one-piece plastic end closure comprising a generally flat annular ring like base, said base having a top wall and a bottom wall and a central opening, a dish-shaped dispensing wall in said central opening, a plurality of dispensing holes in said dispensing wall, a tab movable between an open position and a closed position, said tab being a disc shaped member hingedly connected to said base, said tab including a longitudinally recessed dish-shaped center portion extending longitudinally into said opening of said base and covering said dish-shaped dispensing wall when said tab is in said closed position, and said tab including a pin extending from said dish-shaped portion of said tab into each of said dispensing holes in said dispensing wall when said tab is in said closed position.

11. A one-piece plastic end closure as set forth in claim 10, wherein each of said dispensing holes is tapered, and said pins sealingly engage said dispensing holes when said tab is in said closed position.

* * * * *